US012682540B2

(12) United States Patent
Croxford et al.

(10) Patent No.: US 12,682,540 B2
(45) Date of Patent: Jul. 14, 2026

(54) GRAPHICS PROCESSING

(71) Applicant: Arm Limited, Cambridge (GB)

(72) Inventors: Daren Croxford, Swaffham Prior (GB);
Roberto Lopez Mendez, Cambridge
(GB); Mina Ivanova Dimova, Great
Shelford (GB)

(73) Assignee: Arm Limited, Cambridge (GB)

( * ) Notice: Subject to any disclaimer, the term of this
patent is extended or adjusted under 35
U.S.C. 154(b) by 156 days.

(21) Appl. No.: 18/393,167

(22) Filed: Dec. 21, 2023

(65) Prior Publication Data

US 2025/0209717 A1     Jun. 26, 2025

(51) Int. Cl.
*G06T 15/00*          (2011.01)

(52) U.S. Cl.
CPC ................................. *G06T 15/005* (2013.01)

(58) Field of Classification Search
CPC ....... G06T 15/005; G06T 15/80; G06T 11/40;
G06T 1/20
See application file for complete search history.

(56) References Cited

U.S. PATENT DOCUMENTS

| | | | |
|---|---|---|---|
| 2012/0133465 A1* | 5/2012 | Staniewicz | H01F 7/127 |
| | | | 335/297 |
| 2016/0350154 A1* | 12/2016 | Clohset | G06T 15/005 |
| 2018/0274876 A1* | 9/2018 | Stewart | H04N 7/188 |
| 2021/0407183 A1* | 12/2021 | Guo | G09G 5/363 |

* cited by examiner

*Primary Examiner* — Michelle Chin
(74) *Attorney, Agent, or Firm* — Berkeley Law &
Technology Group, LLP

(57)          ABSTRACT
The present disclosure relates to a method of operating a
graphics processor to process a frame formed of a plurality
of regions, the graphics processor comprising at least one
execution unit with an associated storage element, the at
least one execution unit is operable to process the plurality
of regions according to a shading rate for each region to
generate a processing output to the associated storage ele-
ment, the method comprising: obtaining the shading rate for
one or more of the plurality of regions; determining a
respective processing output size for each of the one or more
regions based on the shading rate for the one or more
regions; forming the one or more regions into at least one
variable processing unit based on the respective processing
output size for each of the one or more regions and a
capacity of the associated storage element; and assigning the
at least one variable processing unit as a processing task to
the at least one execution unit.

20 Claims, 5 Drawing Sheets

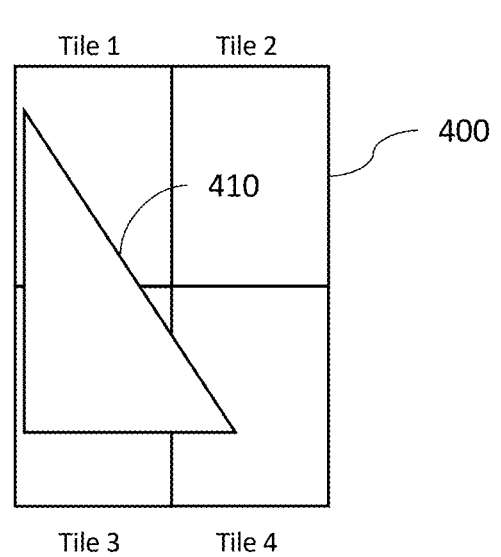
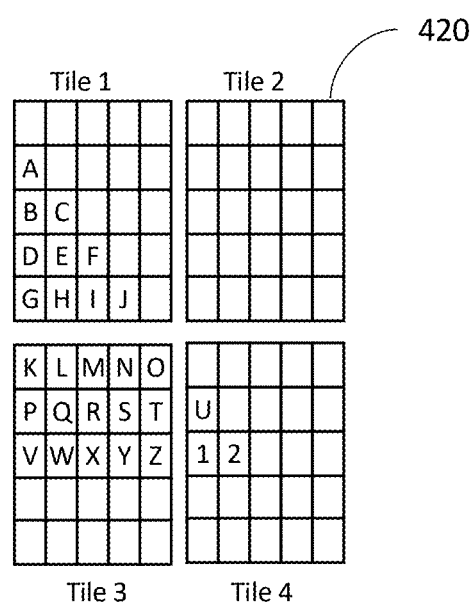
FIG. 4

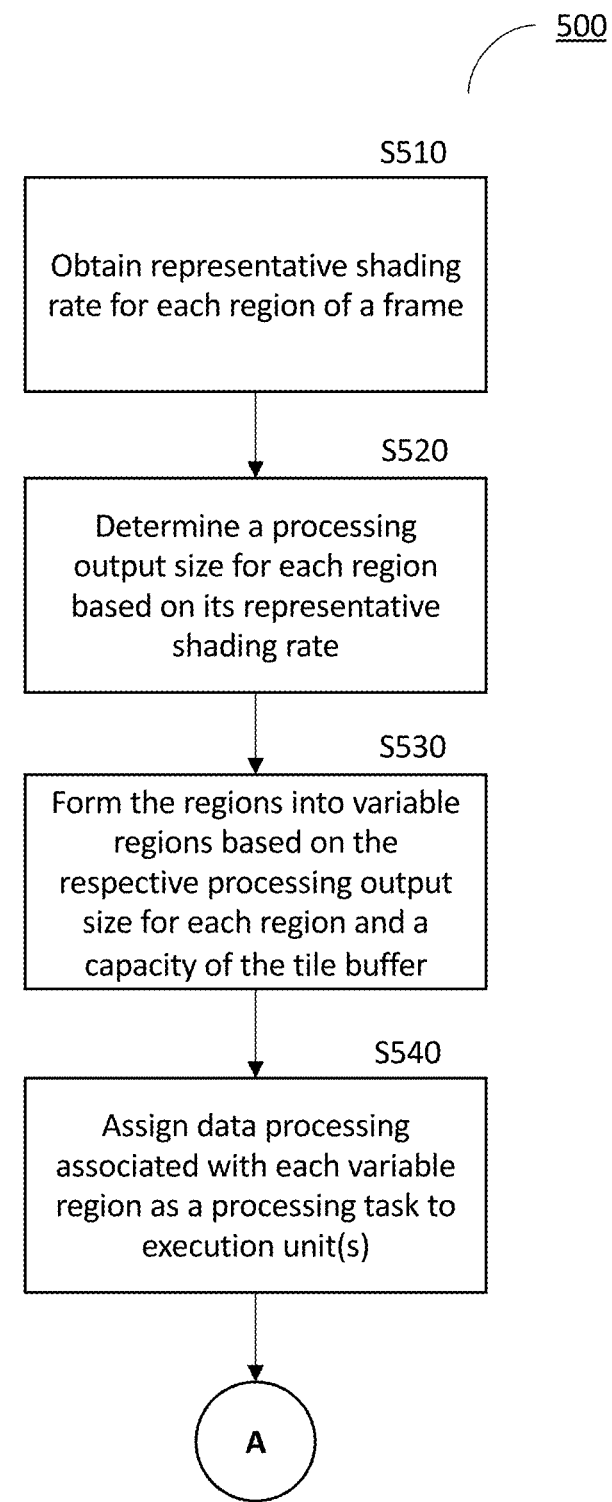

500

S510

Obtain representative shading rate for each region of a frame

S520

Determine a processing output size for each region based on its representative shading rate

S530

Form the regions into variable regions based on the respective processing output size for each region and a capacity of the tile buffer

S540

Assign data processing associated with each variable region as a processing task to execution unit(s)

GRAPHICS PROCESSING

FIELD

The present technology relates to the processing of computer graphics, in particular to methods of operating a graphics processor.

BACKGROUND

Graphics processing is generally performed by first splitting a scene (e.g. a 3D model) to be displayed onto a number of similar basic components or "primitives", which primitives are then subjected to the desired graphics processing operations. The graphics "primitives" are usually in the form of simple polygons, such as triangles.

Once primitives and their vertices have been generated and defined, they can be further processed by a fragment processing pipeline, in order to generate the desired graphics processing output (render output), such as a frame for display.

This usually involves determining which sampling points of an array of sampling points associated with the render output area to be processed are covered by a primitive, and then determining the appearance each sampling point should have (e.g. in terms of its colour) to represent the primitive at that sampling point. These processes are commonly referred to as rasterizing and rendering, respectively.

The rendering process involves deriving the data, such as red, green and blue (RGB) colour values and an "alpha" (transparency) value, necessary to represent the primitive at the sampling points. Where necessary, newly generated data may be blended with data that has previously been generated for the sampling point in question.

In tile-based rendering, the render output is divided into a plurality of smaller regions, herein referred to as "tiles". Each tile is rendered separately (typically one after another), and the rendered tiles are then recombined to provide the complete render output, e.g. a render pass or a frame to be displayed.

A tile-based graphics processing pipeline includes one or more so-called tile buffers that store rendered fragment data at the end of the pipeline until a given tile is completed and written out to an external memory, such as a frame buffer, for use. In some tile-based graphics processing pipelines, the rendered fragment data is compressed before being written out to the external memory.

SUMMARY

An aspect of the present technology provides a method of operating a graphics processor comprising at least one execution unit with an associated storage element, the at least one execution unit is operable to perform data processing associated with a plurality of regions forming a frame according to a respective representative shading rate for each region to generate a processing output to the associated storage element, the method comprising: obtaining the respective representative shading rate for one or more of the plurality of regions; determining a respective processing output size for each of the one or more regions based on the respective representative shading rate for the one or more regions; forming or organising the one or more regions into at least one variable region based on the respective processing output size for each of the one or more regions and a capacity of the associated storage element; and assigning data processing associated with the at least one variable region as a processing task to the at least one execution unit.

According to embodiments of the present technology, a graphics processor is operated to generate a processing output for a frame formed of a plurality of regions, for example to generate a render output that is an image to be displayed. Herein, a region may refer to a tile that comprises a plurality of sampling positions each having a data value associated with it, a variable shading rate region which may or may not correspond with a tile region, or any other suitable or desirable way of dividing a frame, where the plurality of regions may or may not be the same size. Each of the plurality of frame regions is characterised by a respective representative shading rate. It should be noted that a frame region may have more than one shading rate (e.g. different shading rates for different sampling positions within the region), and, in embodiments, the representative shading rate for such a region may be the result of the multiple shading rates within the region combined according to a suitable combination rule. The graphics processor receives, determines, or otherwise obtains the respective representative shading rate for one or more of the plurality of regions, and determines the size of the respective processing output and processing requirement for processing the data associated with each frame region based on the respective representative shading rate for the region. The frame regions are then formed or otherwise organised into one or more variable regions based on the respective processing output size with respect to each region and the capacity of the associated storage element (e.g. tile buffer). The one or more variable regions may differ in the number of frame regions each comprises, for example, each variable region may comprise one frame region, more than one frame region, or a portion of a frame region. The data processing associated with a variable region is then assigned (e.g. by an iterator or suitably configured control circuitry) as a processing task to an execution unit (e.g. a shader core) of the graphics processor. Through forming one or more variable regions by organising one, some or all frame regions according to their associated processing output size and the capacity of the local storage element, it is possible to utilize the local storage element more efficiently to improve memory locality, and where more than one execution units are used, it is possible to distribute processing load more evenly amongst execution units (especially when a region with a high processing requirement is divided into smaller variable regions and data processing associated with these variable regions is distributed as separate tasks), leading to a reduction in the overall processing time for a frame, thus improving the overall performance of the graphics processor. Reducing render pass and/or frame latency is particularly relevant in implementations involving e.g. extended reality (XR), mixed reality (MR), virtual reality (VR), or augmented reality (AR). It should be noted that it is not necessary to organise all regions of a frame into one or more variable regions; in some cases, the graphics processor may only group some of the regions (e.g. regions with low shading rates) into one variable region, in other cases, the graphics processor may only divide one region into multiple variable regions (e.g. a region with high shading rate).

Where a frame region has more than one shading rate, for example when different sampling positions within the region have different shading rates, a suitable combination rule or algorithm may be used to determine a shading rate that is representative of that region when determining the memory requirement and processing load associated with that region. In some embodiments, when a region has a single shading rate, the representative shading rate of the region may be the single shading rate; or when a region has more than one shading rates, the representative shading rate of the region may be a minimum shading rate, an average shading rate, or a maximum shading rate. Using the maximum shading rate of a region as the representative shading rate of the region facilitates the efficient utilization of processing resources.

In some embodiments, the at least one variable region may comprise more than one region of the frame. For example, when there are multiple regions with low shading rates, the processing output for each of these regions may be below the capacity of the local storage element, in which case it may be possible (desirable) to combine some of these regions into a single variable region to make use of the capacity of the storage element more optimally.

In some embodiments, the more than one region may be adjacent each other within the frame. The frame regions that are combined are preferably neighbouring frame regions such that data associated with the neighbouring frame regions may be processed in order, and it ensures that regions that may share the same primitive are preferentially grouped together so that data associated with the same primitive may be processed together to improve the efficiency of region processing.

In some embodiments, the method may further comprise selecting the more than one region to form the at least one variable region based on the same primitive being in the more than one region. Preferentially grouping multiple (low shading rate) regions that share the same primitive allows the primitive to be processed (e.g. rasterised) more efficiently.

A frame region with high shading rate may require a significant amount of time and resources to process. In some embodiments, the at least one variable region may comprise one or more sub-regions, a sub-region being a portion of a region. Thus, a frame region may be divided into multiple variable region, such that data processing associated with each variable region may be assigned as a separate task, where each task requires less time and less resources compared to the whole frame region. This is particularly advantageous when multiple execution units are used, where the multiple variable regions may be assigned to more than one execution units for load balancing.

In some embodiments, the at least one variable region may comprise a first plurality of variable regions, and data processing associated with each of the first plurality of variable regions may represent a similar processing load for the at least one execution unit.

In some embodiments, the graphics processor may comprise a plurality of execution units each having an associated storage element, and the method may further comprise assigning data processing associated with each of the first plurality of variable regions as a first processing task and distributing the plurality of first processing tasks amongst the plurality of execution units.

Towards the end of a frame or a render pass, when there is only a small portion (number) of the frame regions remains for which data processing is to yet be performed, there may be instances when not all of the available execution units are in use, or some may have a higher remaining processing load than others. Thus, in some embodiments, the method may further comprise, when only a portion of the plurality of regions remains for which data processing is to be performed, forming the remaining regions to be processed into a second plurality of variable regions, each of the second plurality of variable regions being smaller with respect to processing output size compared to the first plurality of variable regions. By organising the remaining frame regions into smaller variable regions, e.g. by grouping fewer low shading rate regions together, dividing a high shading rate region into smaller portions, or reorganising existing variable regions into smaller variable regions, the remaining processing load may be distributed more evenly, thus leading to more effective use of resources and an improvement of speed and efficiency.

In some embodiments, the method may further comprise assigning data processing associated with each of the second plurality of variable regions as a second processing task and distributing the plurality of second processing tasks amongst the plurality of execution units.

In some embodiments, each region of the plurality of regions may be a tile in tile-based graphics processing using a tile-based graphics processor.

Another aspect of the present technology provides a graphics processor comprising: at least one execution unit operable to perform data processing associated with a plurality of regions forming a frame according to a respective representative shading rate for each region to generate a processing output; at least one storage element associated with the at least one execution unit to store processing output; and control circuitry operable to: obtain the respective representative shading rate for one or more of the plurality of regions; determine a respective processing output size for each of the one or more regions based on the respective representative shading rate for the one or more regions; form the one or more regions into at least one variable region based on the respective processing output size for each of the one or more regions and a capacity of the associated storage element; and assign data processing associated with the at least one variable region as a processing task to the at least one execution unit.

A further aspect of the present technology provides a non-transitory computer readable storage medium storing software code which, when executing on a processor, performs a method of operating a graphics processor comprising at least one execution unit with an associated storage element, the at least one execution unit is operable to perform data processing associated with a plurality of regions forming a frame according to a respective representative shading rate for each region to generate a processing output to the associated storage element, the method comprising: obtaining the respective representative shading rate for one or more of the plurality of regions; determining a respective processing output size for each of the one or more regions based on the respective representative shading rate for the one or more regions; forming the one or more regions into at least one variable region based on the respective processing output size for each of the one or more regions and a capacity of the associated storage element; and assigning data processing associated with the at least one variable region as a processing task to the at least one execution unit.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

Embodiments will now be described, with reference to the accompanying drawings, in which:

FIG. 4 illustrates the forming of an exemplary "super-tile";

FIG. 5 shows a flow diagram of an exemplary method of processing a frame.

DETAILED DESCRIPTION

The present technology relates to tile-based graphics processing. The exemplary graphics processing pipeline 10 shown in FIG. 1 is a tile-based renderer that produces tiles of a render output data array, such as an output frame to be displayed.

Figure 1:
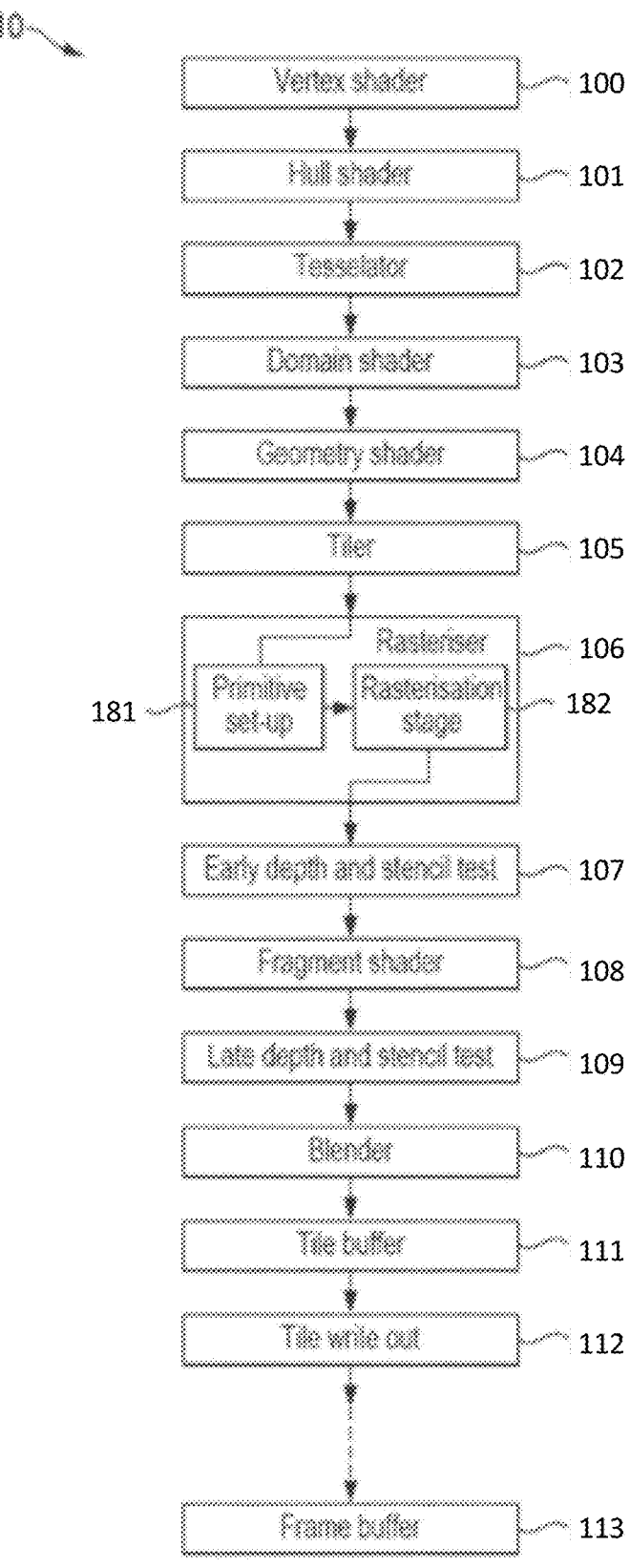
FIG. 1 shows an exemplary graphics processing pipeline.

FIG. 1 shows the main elements and pipeline stages of the graphics processing pipeline 10. As will be appreciated by those skilled in the art, there may be other elements of the graphics processing pipeline that are not shown in FIG. 1. It should be noted here that FIG. 1 is only schematic, and that, for example, in practice, the shown functional units and pipeline stages may share significant hardware circuits, even though they are shown functionally as separate states in FIG. 1. It will also be appreciated that each of the stages, elements and units, etc., of the graphics processing pipeline 10 may be implemented as desired and may accordingly comprise, e.g., appropriate circuitry and/or processing logic, etc., for performing the necessary operation and functions.

The graphics processing pipeline 10 includes a number of stages, including vertex shader 100, a hull shader 101 (in DirectX, or a Tessellation Control Shader in Vulkan or OpenGL), a tesselator 102, a domain shader 103 (in DirectX, or a Tessellation Evaluation Shader in Vulkan or OpenGL), a geometry shader 104, a tiler 105, a rasterization stage 106, an early Z (depth) and stencil test stage 107, a renderer in the form of a fragment shading state 108, a late Z (depth) and stencil test stage 109, a blending stage 110, a tile buffer 111, and a tile write out stage 112 that performs downsampling and writeout (multisample resolve).

The vertex shader 100 takes the input data values (vertex attribute values) associated with the vertices, etc., defined for the output to be generated, and processes those data values to generate a set of corresponding "vertex shaded" output data values for use by subsequent stages of the graphics processing pipeline.

For a given output to be generated by the graphics processing pipeline, there may typically be a set of vertices defined for the output in question. The primitives to be processed for the output may then be indicated as comprising given vertices in the set of vertices for the graphics processing output being generated.

The vertex shading operation operates to transform the attributes for each vertex into a desired form for the subsequent graphics processing operations. This may comprise, in particular, transforming vertex position attribute values from the model or object space for which they are initially defined to the screen space in which the output of the graphics processing system is to be displayed, modifying the input data to take account of the effect of lighting in the image to be rendered, etc.

The vertex shading operation may also convert the originally defined vertex position coordinates to a different, e.g. lower precision, form to be used later on in the graphics processing pipeline.

The hull shader 101 performs operations on sets of patch control points and generates additional data known as patch constants. The tessellation stage 102 subdivides geometry to create higher order representations of the hull, and the domain shader 103 performs operations on vertices output by the tessellation stage (similar to a vertex shader). The geometry shader 104 may (if run) generate primitives such as triangles, points or lines for processing.

Once all the primitives to be rendered have been appropriately processed, e.g. transformed, and/or, e.g. generated by the geometry shader, the tiler 105 then determines which primitives need to be processed for each tile into which the render output has been divided for processing purposes. To do so, the tiler 105 compares the location of each primitive to be processed with the tile positions, and adds the primitive to a respective primitive list for each tile within which it determines the primitive could (potentially) fall. Any suitable and desired technique for sorting and binning primitives into tile lists, such as exact binning, bounding box binning or anything in between, may be used for the tiling process.

Once the tiler 105 has completed the preparation of the primitive tile lists (lists of primitives to be processed for each tile), each tile is then rendered. To do so, each tile is processed by the graphics processing pipeline stages shown in FIG. 1 that follow the tiler 105. Thus, when a given tile is being processed, each primitive that is to be processed for that tile (that is listed in a tile list for that tile) is passed to the rasteriser 106.

The rasterization stage 106 of the graphics processing pipeline 10 operates to rasterise the primitives into individual graphics fragments for processing. In particular, the rasteriser 106, particularly a primitive set-up stage 181 (otherwise known as a triangle set-up unit, TSU) of the rasteriser 106, operates to determine, from the vertex shaded vertices provided to the primitive set-up stage 181, edge information representing each primitive edge of a primitive to be rasterised. This edge information is then passed to a rasterization stage 182 of the rasteriser 106, which rasterises the primitive to sampling points (e.g. pixels) and generates graphics fragments having appropriate positions (representing appropriate sampling positions) for rendering the primitive.

It will be appreciated that, although FIG. 1 shows the primitive set-up stage 181 being part of a single rasterization unit 106, this is not required. It is possible for the primitive set-up stage to be separate from the rasteriser 106, e.g. at a stage of the graphics processing pipeline that is (e.g. immediately) before the rasteriser 106, but after the tiler 105.

The fragments generated by the rasteriser 106 are then sent onwards to the rest of the pipeline for processing.

The early Z/stencil stage 107 performs a Z (depth) test on fragments it receives from the rasteriser 106, to determine if any fragments can be discarded (culled) at this stage. In particular, the early Z/stencil stage 107 compares the depth values of (associated with) fragments issuing from the rasteriser 106 with the depth values of fragments that have already been rendered—these depth values are stored in a depth (Z) buffer that is part of the tile buffer 111—to determine whether the new fragments are occluded by fragments that have already been rendered (or not). At the same time, an early stencil test is also carried out.

Fragments that pass the fragment early Z and stencil test stage 107 are then sent to the fragment shading stage 108. The fragment shading stage 108 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present example, the fragment shading stage 108 is in the form of a shader pipeline (a programmable fragment shader).

There is then a late fragment Z and stencil test state 109, which carries out, amongst other things, an end of pipeline depth test on the shaded fragments to determine whether a rendered fragment can actually be seen in the final image. This depth test uses the Z-buffer value for the fragment's position stored in the Z buffer in the tile buffer 111 to determine whether the fragment data for the new fragments should replace the fragment data of the fragments that have already been rendered, by comparing the depth values of (associated with) fragments issuing from the fragment shading stage 108 with the depth values of fragments that have already been rendered (as stored in the depth buffer). This late fragment depth and stencil test stage 109 also performs any necessary late alpha and/or stencil tests on the fragments.

The fragments that pass the late fragment test stage 109 are then subjected to, if required, any necessary blending operations with fragments already stored in the tile buffer 111 in the blender 110. Any other remaining operations necessary on the fragments, such as dither, etc. (not shown) are also performed at this stage.

Finally, the (blended) output fragment data (values) are written to the tile buffer 111 from where they can e.g. be output to a frame buffer 113 for display. The depth value for an output fragment is also written appropriately to a Z buffer within the tile buffer 111. The tile buffer stores colour and depth buffers that store an appropriate colour, etc., or Z value, respectively, for each sampling point that the buffers represent (in essence for each sampling point of a tile that is being processed). These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 111 is input to a tile write out unit 112, and then output (written back) to an external memory output buffer, such as a frame buffer 113 of a display device (not shown). The display device may comprise, for example, a display comprising an array of pixels, such as a computer monitor or a printer.

The tile write out unit 112 downsamples the fragment data stored in the tile buffer 111 to the appropriate resolution for the output buffer (such that an array of pixel data corresponding to the pixels of the output device is generated) to generate output values (pixels) for output to the output buffer.

Once a tile of the render output has been processed and its data exported to a main memory (e.g. to a frame buffer 113 in a main memory) for storage, the next tile is then processed, and so on, until sufficient tiles have been processed to generate the entire render output (e.g. frame to be displayed). The process is then repeated for the next render output (e.g. frame) and so on. It should be noted that multiple tiles may be processed concurrently, for example each execution unit (e.g. shader core) may process a separately tile in parallel.

Other arrangements for a graphics processing pipeline are of course possible. The graphics processing pipeline 10 may be executed on and implemented by an appropriate graphics processing unit (GPU) that includes the necessary functional units, processing circuitry, etc., operable to execute the graphics processing pipeline stages.

In order to control a graphics processor (GPU) that is implementing a graphics processing pipeline to perform the desired graphics processing pipeline operations, the graphics processor typically receives commands and data from a driver, e.g. executing on a host processor (e.g. CPU), that indicates to the graphics processor the operations that it is to carry out and the data to be used for the operations.

Figure 2:
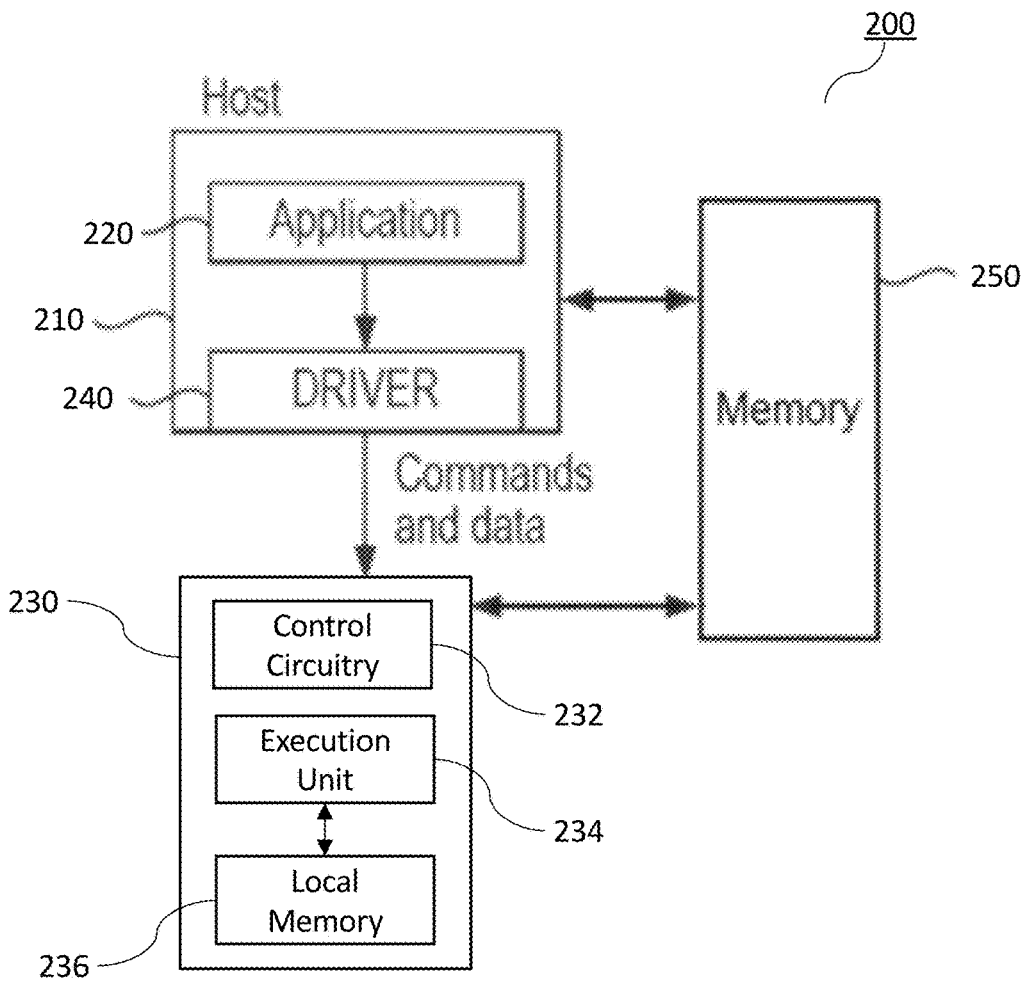
FIG. 2 shows an exemplary graphics processing system.

Accordingly, FIG. 2 shows schematically a typical computer graphics processing system 200, in which an application 220 such as a game executes on a host processor 210. When the application 220 requires graphics processing operations to be performed by an associated graphics processing unit (graphics processing pipeline) 230, it generates appropriate Application Programming Interface (API) calls that are interpreted by a driver 240 for the graphics processor 230 running on the host processor 210, to generate appropriate instructions (and data structures) to the graphics processor 230. The graphics processor 230 then generates graphics output required by the application 220 using the instructions (and data structures).

In particular, the graphics processor 230 comprises control circuitry (e.g. an iterator) 232, at least one (and in some embodiments more than one) execution unit 234 and a local memory 236 (e.g. tile buffer) (where there are more than one execution unit, each execution unit preferably has its own associated local memory). A set of instructions is provided to the graphics processor 230 in response to instructions from the application 220 running on the host system 210 for graphics output (e.g. to generate a frame to be displayed). For example, the driver 240 may send commands and data to the graphics processor 230 by writing to memory 250. The control circuitry 232 breaks up the commands and data into one or more processing tasks, and assigns the tasks to the at least one execution unit 234, which processes the tasks in turn and outputs the processing results to the local memory 236. When a task completes, the processing output is written to memory 250.

Various embodiments are directed to a method of operating a graphics processor in which a shading rate is defined and used when rendering one or more primitives to be rendered. That is, various embodiments are directed to a method in which a render output can be generated using one or more of plural different possible shading rates, i.e. so-called Variable Rate Shading (VRS). It should however be noted that the use of VRS is not essential.

As described above, the rendering process may typically produce a render output comprising an array of sampling points, for each of which appropriate data (e.g. a set of colour value data) is generated. For each output pixel, there is typically a set of one or more corresponding sampling points in the render output. Each such set of sampling points may include only one sampling point, or where downsampling is used, each set of sampling points may include plural sampling points.

Variable Rate Shading (VRS) is a technique that allows different shading rates to be used to render a render output, such that a single colour (set of colour value data) can be sampled (rendered) for one of plural possible different sized areas in a render output. For example, a single colour may be sampled for an area of the render output corresponding to only a single pixel, or a single colour may be sampled for an area of the render output corresponding to each pixel in a block of plural pixels.

Sampling (rendering) a single colour and applying it to plural sampling points (e.g. pixels) can reduce the processing effort required for those sampling points, as compared to sampling an individual colour for each sampling point. However, this comes at the expense of reduced image quality.

In VRS, there is typically a set of plural possible shading rates that a graphics processor supports and is able to use. That is, there is typically a set of plural possible different sized render output areas that a single colour (set of colour value data) can be sampled for. The smallest possible of these render output areas may be referred to as a "fine pixel", while the other, larger, render output areas may be referred to as "coarse pixels".

Each "fine pixel" is typically the same size and location as a pixel of the output display device. However, it is also possible for each "fine pixel" to effectively correspond to less than one pixel of the output display device, for example, where downsampling is to be applied.

The area of each possible "coarse pixel" typically corresponds to a block of plural "fine pixels". The different possible shading rates are then referred to in terms of the number of fine pixels to which the shading rate corresponds. For example, a 1×1 shading rate signifies the finest possible shading mode in which a single colour is sampled for a single fine pixel, whereas a 2×2 shading rate signifies that a single colour is sampled for an area corresponding to a block of 2×2 fine pixels. A graphics processor may typically support 1×1, 1×2, 2×1, 2×2, 2×4, 4×2 and 4×4 shading rates, for example. Typically, different areas of a frame may be rendered at the corresponding shading rates. Coarse pixels are upscaled (e.g. using pixel duplication) such that the final render output or frame buffer output has the same number of pixels as the fine pixel (i.e. same resolution).

In small form factor and/or energy constrained computation environments, an availability of computing resources (e.g., processor cycles, memory, memory bandwidth, power, etc.) may be constrained. Variable rate shading (VRS) is one technique that can be used to limit or reduce usage of computing resources in graphics processing, and/or to focus computation resources on areas of the frame deemed more important (thus giving a user the perception of higher quality results). VRS may allow portions of a scene to be rendered at a higher resolution than other portions of the scene. This may be particularly advantageous, for example, in foveated rendering, where eye tracking determines where an observer is looking, such that high quality/fine granularity rendering may be limited to a fovea region, thereby limiting a number of pixels to be rendered at higher resolutions. Other regions may be rendered with coarser granularity without impacting an observer's perception of quality. A VRS rate does not necessarily indicate the complexity of the region; the portion of the scene that is rendered at a high quality/finer granularity may be a less complex portion of the image. A VRS shading rate may be selected based, at least in part, on other parameters including, for example, primitives that are at a significant distance from a camera or are moving quickly. Such primitives may potentially be shaded at a lower rate without a perceptible degradation in image quality. In other embodiments, a VRS shading rate may be based on a combination of primitive characteristics and overall screen characteristics (e.g. foveated rendering).

In various embodiments, when rendering a primitive, a shading rate may be specified which is determined based (at least in part) on a shading rate defined for one or more of each vertex that defines the primitive, i.e. based on a pre-vertex shading rate.

Figure 3:
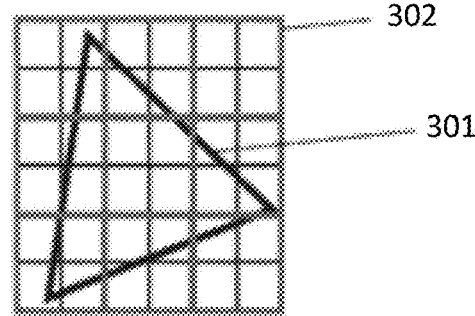
FIG. 3 shows an exemplary primitive being rendered.

FIG. 3 illustrates a comparison of an exemplary primitive 301 being rendered using 1×1 and 2×2 shading rates. The location of the exemplary primitive 301 to be rendered is shown relative to a 6×6 block of fine pixels 302. Each of the small squares represents one of the fine pixels of the VRS process.

In the case of a 1×1 shading rate, the rendering process samples (renders) a single colour (set of colour value data) for each fine pixel that a primitive 301 covers. In this case, the primitive 301 is visible in (covers) 23 out of the 36 illustrated fine pixels, and so the rendering process samples a total of 23 colours (set of colour value data).

Each larger square in FIG. 3 represents one 2×2 coarse pixel that is used in the 2×2 shading rate process. Each 2×2 coarse pixel encompasses a block of 2×2 fine pixels. Thus, the rendering process samples (renders) a single colour (set of colour value data) for each such coarse pixel that a primitive 301 covers. In this case, the primitive 301 covers 8 out of the 9 illustrated 2×2 coarse pixels, and so the rendering process samples only 8 colours (sets of colour values).

Thus, it will be appreciated that a coarser shading rate is associated with a lower density of rendered colours as compared to a finer shading rate. Moreover, it will be appreciated that rendering the primitive 301 using a coarser shading rate will reduce processing requirements, as compared to rendering the primitive 301 using a finer shading rate. However, this will typically come at the expense of reduced image quality.

VRS allows the application 220 to select a shading rate, which means that groups of pixels (1×1, 1×2, 2×1, 2×2, 2×4, 4×2 or 4×4) are shaded once and the colour value is broadcast to all covered pixels in the coarse pixel. This conserves computational effort at the cost of some visual degradation. It is possible to only support some, but not all, of the range of shading rates.

Referring again to FIG. 2, in the present example, the commands and data provided to the graphics processor 230 may include information indicating a shading rate or rates that should be used by the graphics processor 230 when generating a render output. The application 220 may be able to specify shading rate based on the draw call to which the primitive belongs, and/or a provoking vertex with which the primitive is associated, and/or the region of the render output within which the primitive appears. Thus, the application 220 may specify "pre-draw call" shading rates, and/or "pre-primitive" shading rates, and/or "pre-screen space" shading rates. A render output needs not have the same shading rate throughout; it is possible, and in some cases preferable, for a render output to have different shading rates for different regions.

In the case that the application 220 specifies shading rates based on two or more different criteria, the application 220 may also specify how different competing shading rates should be combined. In particular, the application 220 specifies a set of combiner functions that are to be used to combine competing shading rates. For example, the application 220 may specify that competing shading rates should be combined by using the finest or coarsest shading rate, or by determining an average shading rate.

Thus, the commands and data provided by the driver 240 include commands to render primitives for the render output to be generated by the graphics processor 230, together with associated vertex data representing the vertices to be used for the primitives for the render output, and information indicating the shading rates specified by the application 220.

The commands set to the graphics processor 230 cause the graphics processor 230 to read the vertex data from the memory 250, and process the read vertex data to generate the render output accordingly. The graphics processor 230 typically uses the vertex data for a primitive to rasterise the primitive to one or more fragments, each (potentially) applying to a region (area) of the render output. The fragments may then be rendered.

The completed render output (e.g. frame) may be written in a frame buffer in the memory 250, from where it may be provided for display on a display device, such as a screen or printer.

Present embodiments relate to a graphics processor (e.g. tile-based graphics processor) that is operated to generate a processing output based on a plurality of regions forming a frame, such as tiles each comprising a plurality of sampling positions each having an associated data value, to e.g. generate a render output that is an image to be displayed. The frame is processed (e.g. rendered) using variable shading rate, wherein sampling positions within a frame region may have the same or different shading rates. The multiple shading rates within such a region may be combined according to a suitable combination rule or algorithm to give a representative shading rate for the region for the purpose of the present methods. In the case where the same shading rate is applied across a whole region, the representative shading rate for the region is the single shading rate. Each of the plurality of frame regions may then be characterised by its respective representative shading rate. The graphics processor receives, determines, or otherwise obtains the respective representative shading rate for one or more of the plurality of regions, and determines the size of the respective processing output for each frame region based on the respective representative shading rate for the region.

The frame regions may then be formed or otherwise organised into one or more variable regions based on the respective processing output size associated with each region and the capacity of a storage element (e.g. tile buffer) associated with each execution unit that performs the processing. The one or more variable regions may differ in the number of regions comprised in each variable region, for example, each variable region may comprise one region, more than one region, or a portion of a region. The data processing associated with a variable region is then assigned (e.g. by suitably configured control circuitry such as an iterator of the graphics processor) as a processing task to an execution unit.

According to the embodiments, through forming one or more variable regions by organising one, some or all frame regions according to their associated processing output size and the capacity of the local storage element, it is possible to utilize the local storage element more efficiently to improve memory locality (processing output may be kept at the local storage element), and where more than one execution units are used, it is possible to distribute processing load more evenly amongst multiple execution units, leading to a reduction in the overall processing time for a frame, thus improving the overall performance of the graphics processor. It should be noted that it is not necessary to organise all of the regions of a frame into one or more variable regions; in some cases, the graphics processor may group only some of the regions (e.g. regions with low shading rates) into one variable region, in other cases, the graphics processor may divide only one region into multiple variable regions (e.g. a region with high shading rate).

The present approach thus facilitates load balancing in a graphics processor, especially amongst plural execution units (e.g. shader cores) if provided to the graphics processor, and improves memory locality when generating a processing (e.g. render) output for a frame e.g. for display.

In some embodiments, a region (e.g. tile) of a frame with significantly higher shading rate(s) may be divided into more than one sub-regions (sub-tiles) (variable region), data processing associated with each sub-region may be assigned to the same or different shader core as a separate task. In some embodiments, more than one region (e.g. tile) of a frame with low shading rates may be grouped together into a single super-region (super-tile) (variable region) and data associated with each super-region may be processed (rendered) as a single task. Preferably, when grouping multiple frame regions into a super-region, adjacent frame regions are selected to ensure memory locality. The size of a variable region is constrained by the capacity of the output tile buffer (e.g. a buffer size of 64×64 pixels can accommodate a group of four 32×32 tiles). Within a frame, there may be one or more than one such variable regions, and each may comprise a portion of a region, one region, or more than one region, as desired.

Optimisation of Tile Buffer Usage

According to an embodiment of a data processing system, such as the data processing system 200, the driver 240 of the host processor 210 generates metadata (e.g. stored in memory 250 to be used by GPU 230) indicating the shading rate of each frame region of a frame and the amount of data generated from each frame region, to ensure that the processed data associated with each frame region does not exceeds the capacity of the tile buffer 236. The control circuitry 232 (e.g. one or more iterators) then uses this metadata to determine the processing output (output tile) size for each region.

In the present embodiment, based on the determined processing output size associated with each region, the control circuitry may issue data processing (e.g. fragment processing tasks) associated with a frame region with a low shading rate to an execution unit (e.g. execution unit 234) as a single task. On the other hand, the control circuitry may divide a frame region with a high shading rate up into a plurality of smaller regions (sub-regions) and issue data processing associated with each of the smaller regions as a separate task to an execution unit.

The GPU of the present embodiment may divide the frame up into plural variably sized regions based on the shading rates of the frame regions. The control circuitry receives the shading rate for each frame region and determines the most appropriate variable region size that results in an appropriate task size. The control circuitry then issues the data processing (e.g. fragment processing tasks) associated with a variable region, where the variable region may comprise a single frame region or one or more sub-regions, as a separate processing task to an execution unit, indicating the shading rate for the variable region.

In some examples, e.g. for XR (extended reality) use-cases, variable region size may be determined to reduce/minimise frame output latency, by using a variable region size that results in each processing task (i.e. associated with each variable region) requiring approximately the same amount of time (and resources) to perform. High shading rate regions have more sampling positions (pixels) to process and are likely to be more complex. Therefore, a frame region with high shading rate can be divided into multiple sub-regions (variable regions), with data processing associated with each sub-region (variable region) being performed by an execution unit as a separate task. Preferably, the multiple processing tasks associated with respective multiple sub-regions (variable regions) may be distributed amongst multiple execution units.

The present optimisation mode may be optionally enabled or disabled depending upon the ratio of the number of high and low shading rate regions in the frame, as desired.

In further embodiments, towards the end of a frame or a render pass, the size of a variable-region may be reduced so that data processing associated with the remaining portion of the frame/render pass may be distributed more efficiently amongst all available execution units, especially when one or more execution units may be waiting idle. This further reduces frame/render pass latency.

Optimisation of Tile Size

According to another embodiment of a data processing system, such as the data processing system 200, data processing associated with low shading rate frame regions is optimised based on tile buffer usage through combining more than one low shading rate frame regions into a single (or smaller number of) variable region(s).

Similar to the previous embodiment, the driver determines (e.g. by analysing the shader program) the amount of data output for each sampling position (pixel) of a frame (e.g. factoring G-buffer and super sampling). The shading rate for each region across a frame is provided to the GPU, e.g. via shared memory, and the highest shading rate is determined. The pixel output information (metadata) and shading rate information are used to determine the amount of space required in GPU local storage (e.g. tile buffer) to receive the processing (e.g. render) output associated with a frame region with the highest shading rate.

This maximum storage capacity information then serves as an indication for a suitable size for a variable region, to determine if more than one low shading rate frame regions may be combined into a single variable region without their combined associated output overflowing local storage. If it is determined to be possible, local storage requirements for processing output associated with adjacent frame regions are determined. Based on the processing output size associated with adjacent frame regions, the driver/shader program and/or the tiler can then determine whether adjacent regions (e.g. a 2×2 area of frame regions) may be grouped together and their data processing (e.g. fragment processing tasks) may be assigned as a single processing task.

FIG. 4 illustrates how adjacent frame regions may be selected to be combined into a variable region. When a frame region 400, e.g. Tile 1, is rasterised, a primitive, e.g. primitive 410, is broken down into a plurality of fragments, e.g. fragments 420, and the extent of the primitive 410 is determined. The primitive is then processed (rasterised) in order, e.g. for Tile 1, pixel A, pixel B, pixel C, etc.

As shown in FIG. 4, the primitive 410 covers multiple frame regions, Tile 1, Tile 3 and Tile 4. When rasterising, only pixels within the current frame region are rasterised. So for example, if Tile 1 is being processed, only pixels A to J are rasterised. The analysis of whether a primitive is within the boundary of a frame region may for example be performed using exact binning or bounding box binning, etc. For example, using exact binning, the primitive 410 would be indicated as being in Tiles 1, 2, 4, while using bounding box binning the primitive 410 would be indicated as being in Tiles 1, 2, 3, 4.

When multiple frame regions are combined into a variable region and data processing associated with the variable region is to be issued as a single task, it may be preferable to combine multiple frame regions that are spatially local, e.g. adjacent to each other, such that the likelihood of the same primitive being in the selected group of frame regions is increased and the primitive can be rasterised more efficiently. The rasteriser is then configured to process across the entire variable region (super-region).

In implementations where a hierarchical tiler is used, a super-region is formed before the tiler generates polygon lists. Metadata of the multiple regions in the processing unit may be used by the hierarchical tiler to eliminate the lowest level of the polygon list for this super-region. The metadata of the processing unit may then be provided to the fragment iterator and sent to the shader core (execution unit) so that the multiple regions in the super-region may be processed together.

In conventional approaches, where data processing associated with each low shading rate region is issued as a separate task to an execution unit (e.g. shader cores), the shader program and MIPMAP for each polygon are fetched separately for each task (i.e. each region) even in cases where more than one such low shading rate regions share the same primitive, leading to inefficient use of memory bandwidth and output memory capacity.

The present approach makes efficient use of the (limited) tile buffer resources by reducing the overall number of tasks needed to be performed to generate a render output for a frame, thereby improving efficiency. Through the present approach, it is possible to reduce the amount of data that needs to be output by the tiler (e.g. by eliminating the writing out of the lower level polygon list). Moreover, the shader program and MIPMAP are only required to be fetched once for each primitive for the entire variable region even when more than one frame regions are involved. Thus, the present approach improves the efficiency of local storage usage (e.g. tile buffer in the shader core), reduces the likelihood that a primitive is being considered when it may not be in the current frame region (thereby improving performance), and improves memory locality (and therefore processing efficiency) in the shader core/memory system.

Dividing a frame region into multiple variable regions and/or clustering of multiple frame regions into a single variable region may be performed based on the shading rates of the current frame. Alternatively, or additionally, the organisation of frame regions into one or more variable regions in the previous frame may be analysed and used to guide the organisation of frame regions in the current or the next frame.

FIG. 5 shows an exemplary method 500 of operating a graphics processor, such as the GPU 230, to generate a processing output, e.g. a render output, for a frame. In embodiments, a frame is regarded as being formed of a plurality of regions (e.g. tiles in tile-based graphics processing). The graphics processor comprises at least one execution unit (e.g. execution unit 234) with an associated storage element (e.g. local storage 236). The at least one execution unit is operable to perform data processing associated with the plurality of regions of a frame according to the respective representative shading rate for each region to generate a processing output to the associated storage element. The representative shading rate of a region is a shading rate that is to be used for that region for the purpose of determining/gauging its processing requirement and the size of its associated processing output. Thus, if a region has a single shading rate across the whole region (shared by all sampling positions in the region), then the representative shading rate of the region is the single shading rate; if a region has more than one shading rates (sampling positions within the region have different shading rates), the representative shading rate of the region may be determined using a suitable combination rule or algorithm, and the representative shading rate for the region may be the minimum shading rate, the average shading rate, or the maximum shading rate of the region.

The method begins at S510, by obtaining the respective representative shading rate for at least some regions out of the plurality of regions. Preferably, the representative shading rate of each of the plurality of regions is determined, received or otherwise obtained.

At S520, the respective processing output size associated with each of the regions is determined based on the respective representative shading rate for the region, as described above.

Then at S530, one or more of the regions, some of the regions, or all of the plurality of regions is formed or organised into one or more variable regions based on the respective processing output size for each of the regions and the capacity of the associated storage element.

The data processing (e.g. fragment processing) associated with each variable region is then assigned or issued, at S540, as a processing task to the at least one execution unit, or in the case of more than one execution unit, plural processing tasks associated with respective plural variable regions are distributed amongst multiple execution units. It should be noted that, when the at least one execution unit performs data processing associated with a variable region, in cases where there are more than one shading rate across each frame region, the data processing associated with the variable region is preferably performed according to the corresponding shading rates of the various areas and portions across the variable region and not the representative shading rate.

According to some embodiments, a variable region may comprise more than one frame region, and data processing associated with the more than one frame region is to be grouped into a single processing task. Preferably, the plural regions are adjacent each other within the frame. Optionally, the plural regions are selected to form a single variable region based on the same primitive being in the plural regions.

According to other embodiments, a variable region may comprise one or more sub-regions, where each sub-region is a portion of a region.

Where a plurality of variable regions is formed, either from dividing a frame region into multiple sub-regions, grouping multiple frame regions into one or more super-regions, or a combination of both, data processing associated with each of the plurality of variable regions preferably represents a similar processing load (similar amount of processing, similar processing output size, similar output tile buffer requirement) for an execution unit. Then, in a graphics processor provided with a plurality of execution units, each having an associated storage element (corresponding tile buffer), data processing associated with each of the plurality of variable regions may be assigned as a separate processing task and the plurality of processing tasks may be distributed amongst the plurality of execution units.

Figure 6:
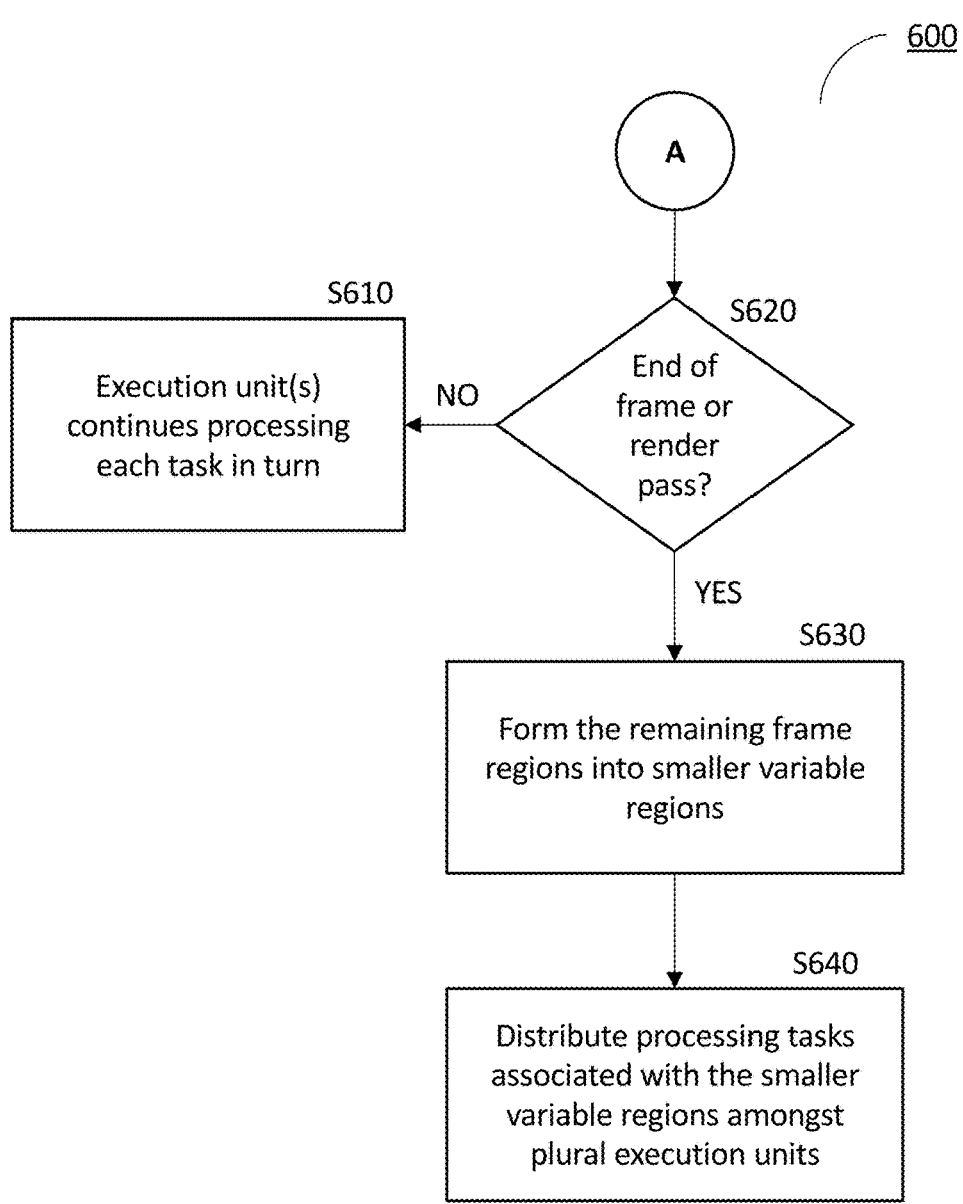
FIG. 6 shows an exemplary optional extension to the method of FIG. 5.

FIG. 6 shows an exemplary optional extension to the method of FIG. 5. At S610, the execution unit or plurality of execution units continues to process the tasks that have been issued. However, towards the end of the frame or the end of a render pass, S620, for example when only a portion of the plurality of regions remains (YES branch), the remaining regions for which data processing is yet to be performed may be formed or organised, at S630, into a plurality of smaller variable regions. Each of the plurality of smaller variable regions is smaller in the sense that, compared to a variable region formed towards the beginning of the frame or render pass, data processing associated with the smaller variable region has lower processing requirement and lower output buffer requirement (its processing output is smaller in size) and therefore require less time to process.

Then, at S640, data processing associated with each of the smaller variable regions is issued as an individual processing task and the plurality of processing tasks are distributed amongst the plurality of execution units. In doing so, the remaining processing required towards the end of a frame or render pass may be shared amongst available execution units to optimise the usage of available processing resources.

Thus, the present approach assesses the expected amount of data processing associated with different regions of a frame to form one or more variable regions that optimally use the available processing and/or buffer resources. In particular, low shading rate regions may be grouped into a single variable region and data processing associated with these low shading rate regions may be issued together as a single task to optimise tile buffer utilization, while/or a high shading rate region may be divided into multiple variable regions and data processing associated with portions of the high shading rate region may be issued separately as individual tasks, such that the overall processing load may be more evenly distributed amongst multiple processing cores in the graphics processor by allocating each processing core with a substantially equal share of the overall load. In doing so, long delays from processing high shading rate regions may be avoided and as such the overall processing (rendering) time of the frame is minimised.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high-speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

The examples and conditional language recited herein are intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its scope as defined by the appended claims.

Furthermore, as an aid to understanding, the above description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to limit the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labelled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

It will be clear to one skilled in the art that many improvements and modifications can be made to the foregoing exemplary embodiments without departing from the scope of the present techniques.

What is claimed is:

1. A method of operating a graphics processor comprising at least one execution unit with an associated storage element, the at least one execution unit is operable to perform data processing associated with a plurality of regions forming a frame according to a respective representative shading rate for each region to generate a processing output to the associated storage element, the method comprising:
   obtaining the respective representative shading rate for one or more of the plurality of regions;
   determining a respective processing output size for each of the one or more of the plurality of regions based on the respective representative shading rate for the one or more of the plurality of regions;
   forming the one or more of the plurality of regions into at least one variable region based on the respective processing output size for each of the one or more of the plurality of regions and a capacity of the associated storage element; and
   assigning data processing associated with the at least one variable region as a processing task to the at least one execution unit.

2. The method of claim 1, wherein,
   when a region has a single shading rate, the respective representative shading rate for the region is the single shading rate; or
   when a region has more than one shading rates, the respective representative shading rate of the region is a minimum shading rate, an average shading rate, or a maximum shading rate.

3. The method of claim 1, wherein the at least one variable region comprises more than one region of the frame.

4. The method of claim 3, wherein the more than one region of the frame is adjacent each other within the frame.

5. The method of claim 1, wherein the at least one variable region comprises one or more sub-regions, a sub-region being a portion of a region.

6. The method of claim 1, wherein the at least one variable region comprises a first plurality of variable regions, and data processing associated with each of the first plurality of variable regions represents a similar processing load for the at least one execution unit.

7. The method of claim 6, wherein the graphics processor comprises a plurality of execution units each having an associated storage element, and the method further comprises assigning data processing associated with each of the first plurality of variable regions as a first processing task of a plurality of first processing tasks, and distributing the plurality of first processing tasks amongst the plurality of execution units.

8. The method of claim 7, further comprising, when only a portion of the plurality of regions remains for which data processing is to be performed, forming the remaining regions into a second plurality of variable regions, each of the second plurality of variable regions being smaller with respect to processing output size compared to the first plurality of variable regions.

9. The method of claim 8, further comprising assigning data processing associated with each of the second plurality of variable regions as a second processing task of a plurality of second processing tasks, and distributing the plurality of second processing tasks amongst the plurality of execution units.

10. The method of claim 1, wherein each region of the plurality of regions is a tile in tile-based graphics processing using a tile-based graphics processor.

11. A graphics processor comprising:
   at least one execution unit operable to perform data processing associated with a plurality of regions forming a frame according to a respective representative shading rate for each region to generate a processing output;
   at least one storage element associated with the at least one execution unit to store processing output; and
   control circuitry configured to:
   obtain the respective representative shading rate for one or more of the plurality of regions;
   determine a respective processing output size for each of the one or more of the plurality of regions based on the respective representative shading rate for the one or more of the plurality of regions;
   form the one or more of the plurality of regions into at least one variable region based on the respective processing output size for each of the one or more of the plurality of regions and a capacity of the associated at least one storage element; and
   assign data processing associated with the at least one variable region as a processing task to the at least one execution unit.

12. The graphics processor of claim 11, wherein,
   when a region has a single shading rate, the respective representative shading rate of the region is the single shading rate; or
   when a region has more than one shading rates, the respective representative shading rate of the region is a minimum shading rate, an average shading rate, or a maximum shading rate.

13. The graphics processor of claim 11, wherein the at least one variable region comprises more than one region of the frame.

14. The graphics processor of claim 13, wherein the more than one region of the frame is adjacent each other within the frame.

15. The graphics processor of claim 11, wherein the at least one variable region comprises one or more sub-regions, a sub-region being a portion of a region.

16. The graphics processor of claim 11, wherein the at least one variable region comprises a first plurality of variable regions, and data processing associated with each of the first plurality of variable regions represents a similar processing load for the at least one execution unit.

17. The graphics processor of claim 16, wherein the graphics processor comprises a plurality of execution units each having an associated storage element, and the control circuitry is further configured to assign data processing associated with each of the first plurality of variable regions as a first processing task of a plurality of first processing tasks, and distribute the plurality of first processing tasks amongst the plurality of execution units.

18. The graphics processor of claim 17, wherein the control circuitry is further configured to, when only a portion of the plurality of regions remains for which data processing is to be performed, form the remaining regions into a second plurality of variable regions, each of the second plurality of variable regions being smaller with respect to processing output size compared to the first plurality of variable regions.

19. The graphics processor of claim 18, wherein the control circuitry is further configured to assign data processing associated with each of the second plurality of variable regions as a second processing task of a plurality of second processing tasks, and distribute the plurality of second processing tasks amongst the plurality of execution units.

20. A non-transitory computer readable storage medium storing software code which, when executing on a processor, performs a method of operating a graphics processor comprising at least one execution unit with an associated storage element, the at least one execution unit is operable to perform data processing associated with a plurality of regions forming a frame according to a respective representative shading rate for each region to generate a processing output to the associated storage element, the method comprising:
   obtaining the respective representative shading rate for one or more of the plurality of regions;
   determining a respective processing output size for each of the one or more of the plurality of regions based on the respective representative shading rate for the one or more of the plurality of regions;
   forming the one or more of the plurality of regions into at least one variable region based on the respective processing output size for each of the one or more of the plurality of regions and a capacity of the associated storage element; and
   assigning data processing associated with the at least one variable region as a processing task to the at least one execution unit.

* * * * *